United States Patent
Roberge et al.

(10) Patent No.: US 10,822,183 B2
(45) Date of Patent: Nov. 3, 2020

(54) METHOD OF DELIVERING A NUMBER OF AGRICULTURAL PRODUCTS

(71) Applicant: CNH Industrial Canada, Ltd., Saskatoon (CA)

(72) Inventors: Martin J. Roberge, Saskatchewan (CA); Joel Denis, Saskatchewan (CA); Rex L. Ruppert, Benson, MN (US); Guillaume C. Boily, Martensville (CA)

(73) Assignee: CNH Industrial Canada, Ltd., Saskatchewan (CA)

( * ) Notice: Subject to any disclaimer, the term of this patent is extended or adjusted under 35 U.S.C. 154(b) by 0 days.

(21) Appl. No.: 16/574,539

(22) Filed: Sep. 18, 2019

(65) Prior Publication Data

US 2020/0010286 A1  Jan. 9, 2020

Related U.S. Application Data

(62) Division of application No. 15/652,706, filed on Jul. 18, 2017, now Pat. No. 10,494,199.

(51) Int. Cl.
*A01C 7/10* (2006.01)
*B65G 53/46* (2006.01)
(Continued)

(52) U.S. Cl.
CPC .......... *B65G 53/4608* (2013.01); *A01C 7/081* (2013.01); *A01C 7/102* (2013.01);
(Continued)

(58) Field of Classification Search
CPC ....... B65G 53/528; A01C 7/081; A01C 7/082; A01C 7/084; A01C 15/003; A01C 15/04; A01C 17/008; A01C 7/102; B01F 13/0035
(Continued)

(56) References Cited

U.S. PATENT DOCUMENTS 199,912 A * 2/1878 Doe .......................... C10J 3/00
 48/64
3,851,604 A * 12/1974 Seifert, Jr. ............. A01C 7/123
 111/77
(Continued)

FOREIGN PATENT DOCUMENTS

WO  2015173751  11/2015

*Primary Examiner* — Joseph A Dillon, Jr.
(74) *Attorney, Agent, or Firm* — Rebecca L. Henkel; Rickard K. DeMille

(57) ABSTRACT

The present invention is directed to an applicator having an agricultural product conveying system which transfers particulate material from one or more source containers to application equipment on demand, and meters the material at the application equipment. The conveying system includes an inline metering system including a number of metering devices associated with each compartment of a particulate material tank on the applicator to meter the particulate material disposed within each compartment. The individual metering devices include gates to initially enable the particulate material from a compartment to enter the metering device, and a rotary metering shaft to meter the flow of the particulate material into the conduits while limiting the passage of pressurized air through the metering device and into the compartment. The individual metering devices also include individual motors to control the operation of the metering devices independently from one another that can allow with sectional control and turning compensation.

4 Claims, 9 Drawing Sheets

(51) Int. Cl.
A01C 21/00 (2006.01)
B65G 53/42 (2006.01)
A01C 7/08 (2006.01)
A01C 7/12 (2006.01)
A01C 15/00 (2006.01)
A01C 15/04 (2006.01)

(52) U.S. Cl.
CPC ............ A01C 7/127 (2013.01); A01C 21/002 (2013.01); B65G 53/42 (2013.01); B65G 53/4633 (2013.01); A01C 7/082 (2013.01); A01C 15/006 (2013.01); A01C 15/04 (2013.01)

(58) Field of Classification Search
USPC .................... 406/39, 181, 197; 111/175, 178
See application file for complete search history.

(56) References Cited

U.S. PATENT DOCUMENTS

| | | | |
|---|---|---|---|
| 3,970,224 A * | 7/1976 | Chatham | E21D 9/12 222/370 |
| 4,049,247 A | 9/1977 | Stamer et al. | |
| 4,341,492 A | 7/1982 | Montgomery, Jr. et al. | |
| 4,410,106 A | 10/1983 | Kierbow et al. | |
| 4,423,988 A | 1/1984 | Cote | |
| 4,514,114 A | 4/1985 | Fuss et al. | |
| 4,536,121 A | 8/1985 | Stewart et al. | |
| 4,545,511 A * | 10/1985 | Lastinger | A01C 7/04 111/77 |
| 4,787,783 A | 11/1988 | Giradelli | |
| 4,938,848 A | 7/1990 | Raines et al. | |
| 4,978,252 A | 12/1990 | Sperber | |
| 5,097,988 A * | 3/1992 | de Deyne | G01G 13/246 222/77 |
| 5,417,261 A * | 5/1995 | Kanzler | B65B 39/002 141/10 |
| 5,538,383 A | 7/1996 | Ikeda et al. | |
| 5,592,889 A | 1/1997 | Bourgault | |
| 5,765,720 A | 6/1998 | Stufflebeam et al. | |
| 5,775,585 A * | 7/1998 | Duello | A01C 15/04 239/654 |
| 5,775,852 A | 7/1998 | Boutte et al. | |
| 5,802,994 A * | 9/1998 | Kinkead | A01C 7/008 111/11 |
| 5,996,516 A | 12/1999 | Benneweis et al. | |
| 6,135,317 A | 10/2000 | Ruelle et al. | |
| 6,145,709 A | 11/2000 | Hogan et al. | |
| 6,192,813 B1 * | 2/2001 | Memory | A01C 7/081 111/176 |
| 6,527,205 B2 * | 3/2003 | Andersson | A01C 7/044 239/656 |
| 6,666,627 B1 | 12/2003 | Wysong | |
| 6,851,377 B2 | 2/2005 | Mayerle et al. | |
| 7,144,204 B2 | 12/2006 | Hilgraf | |
| 7,377,221 B1 | 5/2008 | Brockmeier | |
| 7,380,733 B2 * | 6/2008 | Owenby | A01C 15/122 239/656 |
| 7,571,688 B1 | 8/2009 | Friestad et al. | |
| 7,690,440 B2 | 4/2010 | Dean et al. | |
| 8,151,719 B2 * | 4/2012 | Audette | A01C 7/06 111/179 |
| 8,868,300 B2 | 10/2014 | Kocer et al. | |
| 8,905,681 B2 | 12/2014 | Schneider et al. | |
| 8,931,426 B2 | 1/2015 | Friggstad | |
| 9,199,804 B2 | 12/2015 | Hughes | |
| 9,265,188 B2 | 2/2016 | Thompson | |
| 9,681,602 B2 | 6/2017 | Montag et al. | |
| 10,045,478 B2 * | 8/2018 | Posselius | A01C 7/082 |
| 2003/0044244 A1 | 3/2003 | Sailey, Jr. | |
| 2003/0217679 A1 * | 11/2003 | Lempriere | A01C 7/12 111/100 |
| 2003/0235473 A1 | 12/2003 | Wysong et al. | |
| 2005/0241070 A1 | 11/2005 | Wake et al. | |
| 2006/0045729 A1 | 3/2006 | Heep | |
| 2007/0205213 A1 * | 9/2007 | Audette | A01C 7/06 221/185 |
| 2009/0165686 A1 * | 7/2009 | Memory | A01C 7/082 111/175 |
| 2011/0204001 A1 | 8/2011 | Gaudfrin | |
| 2013/0101384 A1 | 4/2013 | Cresswell et al. | |
| 2014/0166439 A1 | 6/2014 | Hughes | |
| 2014/0216315 A1 | 8/2014 | Beaujot et al. | |
| 2014/0261116 A1 | 9/2014 | Redman et al. | |
| 2015/0059858 A1 | 3/2015 | Ellis | |
| 2015/0223391 A1 * | 8/2015 | Wendte | A01C 7/04 111/177 |
| 2016/0091105 A1 | 3/2016 | Hammond et al. | |
| 2016/0095276 A1 * | 4/2016 | Roberge | A01C 7/122 239/8 |
| 2016/0120104 A1 | 5/2016 | Chahley et al. | |
| 2016/0120112 A1 * | 5/2016 | Gervais | A01C 7/121 222/173 |
| 2016/0135362 A1 * | 5/2016 | Connors | A01C 7/102 701/50 |
| 2016/0207017 A1 * | 7/2016 | Montag | A01C 15/006 |
| 2017/0086355 A1 * | 3/2017 | Borkgren | A01C 7/082 |
| 2018/0118474 A1 | 5/2018 | Schilling et al. | |
| 2018/0352726 A1 * | 12/2018 | Chini | A01C 7/127 |
| 2018/0356269 A1 * | 12/2018 | Montag | G01F 11/003 |
| 2019/0223371 A1 * | 7/2019 | Altepeter | A01C 19/02 |

* cited by examiner

METHOD OF DELIVERING A NUMBER OF AGRICULTURAL PRODUCTS

CROSS-REFERENCE TO RELATED APPLICATION

This application is a division of U.S. Ser. No. 15/652,7067, filed Jul. 18, 2017, the entirety of which is incorporated herein.

FIELD OF THE DISCLOSURE

The present invention relates generally to agricultural equipment, and, more particularly, to an agricultural product delivery system on an application implement, such as a planter or fertilizer application equipment, for applying particulate material such as seed, fertilizer, herbicide or insecticide in a field, either as a surface application or deposited in the soil to improve soil quality.

BACKGROUND OF THE DISCLOSURE

Agricultural product delivery systems are known to utilize various mechanisms, including mechanical and pneumatic systems, i.e., a flow of air, to assist in the delivery and movement of particulate material or product such as fertilizer, seed, insecticide or herbicide from a product supply chamber through an interior passage provided by a series of elongate tubes which extend from the product supply chamber to a product applicator that places the product on or in growing medium, such as soil. Such agricultural product delivery systems are commonly employed in planters, air drills, fertilizer and pesticide applicators and a variety of other agricultural implements.

Agricultural implements that employ an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and in dilute phase.

Systems as described have provided certain advantages and have worked acceptably in some aspects, but are not without disadvantages, inefficiencies or inconveniences. For example, it is desirable to use a material supply source, such as a tank, with different applicator equipment, for example, by coupling the tanks with a planter for planting seed, and later coupling the same tank equipment with an applicator for applying needed pesticides and/or fertilizer. This has been difficult due to the necessary metering systems for applying the different materials. With the metering device provided on the tank, it is necessary to adjust the metering device whenever the tank is used for supplying a different material. This can be time consuming and inconvenient if the metering device is underneath the tank.

While the use of a metering system can effectively distribute the different particulate material to the various distribution channels and nozzles of the applicator, the metering system itself is a complex mechanism that must be accurately operated in order to effectively distribute the particulate matter to each nozzle and to accommodate for operational changes including additional particulate material(s) to be dispensed and turning compensations, among others.

Further, the prior art metering systems suffer from issues with regard to the ability of the metering systems to separately meter multiple particulate materials into a distribution channels and to reduce any interference of pneumatic air flow through the distribution channels with the metering of the particulate materials by the metering systems.

What is needed in the art is an agricultural product conveying system which improves efficiency and convenience of the applicator without further complicating its construction.

SUMMARY OF THE DISCLOSURE

According to one aspect of the present disclosure, an applicator includes an agricultural product conveying system which transfers particulate material from one or more source containers to application equipment on demand, and meters the material at the application equipment. The pneumatic or mechanical conveying system employs longitudinal tubes or conduits that operate pneumatically with a pressurized air flow and/or mechanically with mechanical devices to move and mix the particulate material from one of the source containers or tanks along the conveying system. In the conveying system, the different types of particulate materials are blended, such as within a rotary distributor, and delivered to the distribution nozzles for discharge from the applicator. The conveying system has a simplified construction and operation in comparison to prior art systems and allows for easier sectional control and turning compensation.

The conveying system includes an inline metering system including a number of metering devices associated with each of the compartment of a particulate material tank on the application to meter the particulate material disposed within each compartment. The individual metering devices include gates to initially enable the particulate material from a compartment to enter the metering device, and a rotary metering shaft to meter the flow of the particulate material into the conduits while limiting the passage of pressurized air through the metering device and into the compartment. The individual metering devices also include individual motors to control the operation of the metering devices independently from one another.

According to another aspect of the invention, an agricultural product delivery system includes at least one particulate material supply compartment, at least one particle delivery unit for applying particulate material from the supply compartment, a conveying system providing a flow of particulate material from the at least one particulate material supply compartment to the at least one particle delivery unit and at least one metering device operably connected between the at least one particulate material supply compartment and the conveying system According to another aspect of the invention, an agricultural product delivery system includes a number of particulate material supply compartments, a number of particle delivery units for applying particulate material from the supply compartment, a conveying system including a number of supply lines providing a flow of particulate material from each of the number of particulate material supply compartments to the number of particle delivery units and a number of sets of metering devices operably connected between each of the particulate material supply compartments and the supply lines of the conveying system.

According to a further aspect of the present invention, a method of delivering a number of agricultural products from a number of compartments containing the number of products to a delivering unit to applying the products in a field includes the steps of supplying the number of agricultural products from the number of particulate material supply compartments to a conveying system; metering the products from the number of compartments into the conveying system though at least one metering device including a housing connected between at least one of the compartments and the conveying system, a guide disposed on one end of the housing and defining an inlet opening disposed in alignment with a discharge aperture in an adjacent compartment, a gate slidably engaged with the guide to selectively open and close the inlet opening, a shaft disposed within the housing, the shaft including a number of paddles thereon, wherein the clearance between the paddles and the housing limits air flow through the each metering device between the supply line and the adjacent particulate material supply compartment and a motor operably connected to the shaft to rotate the shaft within the housing; mixing the agricultural product in the conveying system to form a mixed product; conveying the mixed product to the delivering unit; and applying the mixed product from the delivering unit onto an agricultural field.

Numerous additional objects, aspects and advantages of the present invention will be made apparent from the following detailed description taken together with the drawing figures.

BRIEF DESCRIPTION OF THE DRAWINGS

The drawings illustrate the best mode of practicing the present disclosure.

In the drawings.

DETAILED DESCRIPTION OF THE DISCLOSURE

Figure 1:
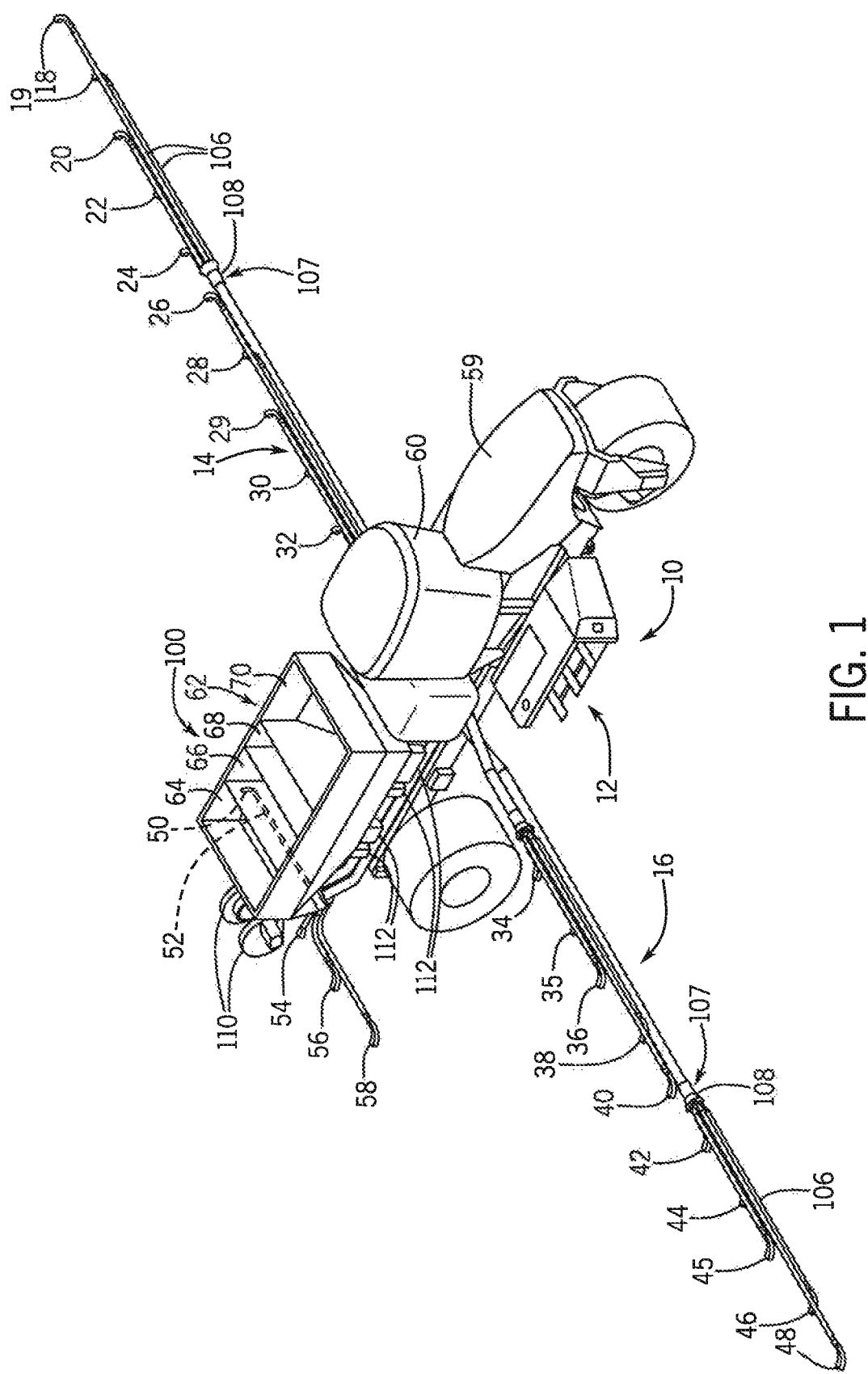
FIG. 1 is an isometric view of an agricultural application implement, in the nature of a fertilizer spreader, having a conveying system according to one exemplary embodiment of the invention.
Figure 2:
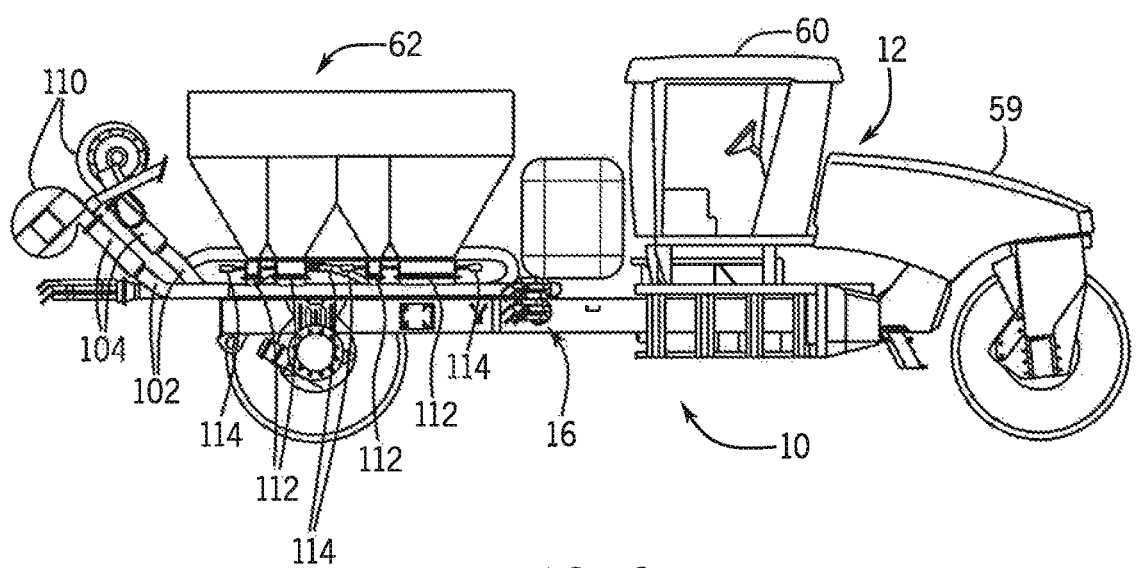
FIG. 2 is a side elevation view of the fertilizer spreader shown in FIG. 1
Figure 3:
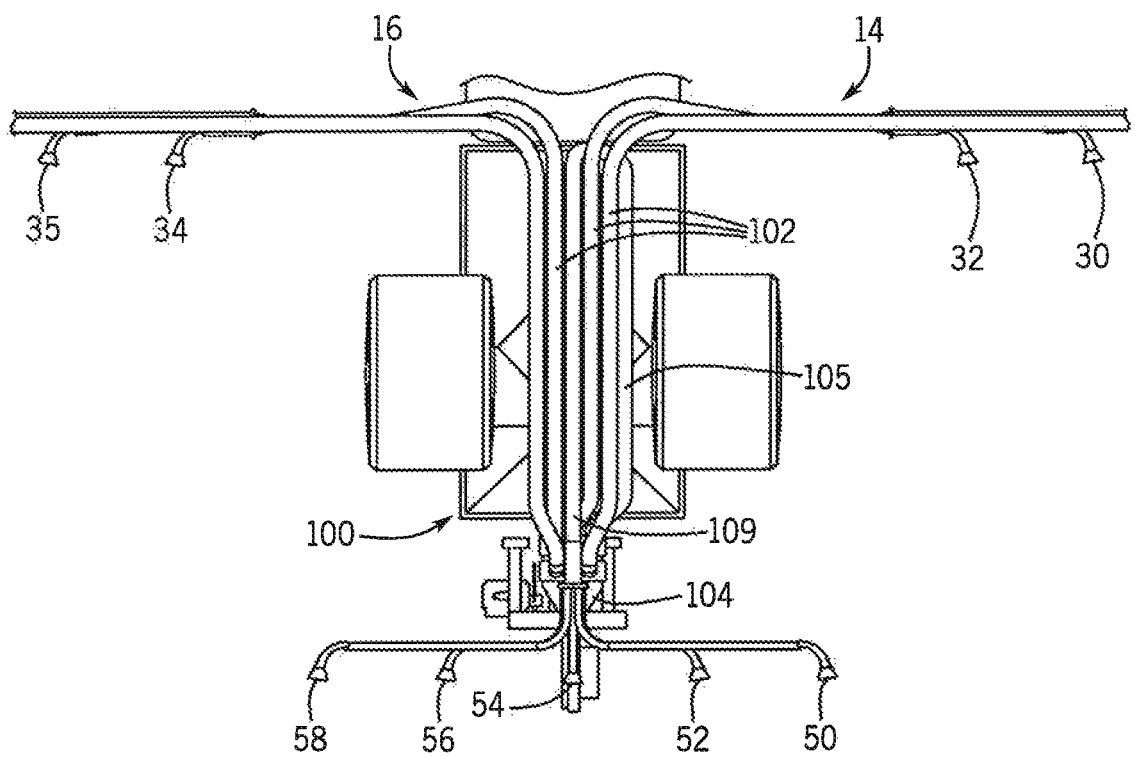
FIG. 3 is bottom plan view of the conveying system according to another exemplary embodiment of the invention.
Figure 4:
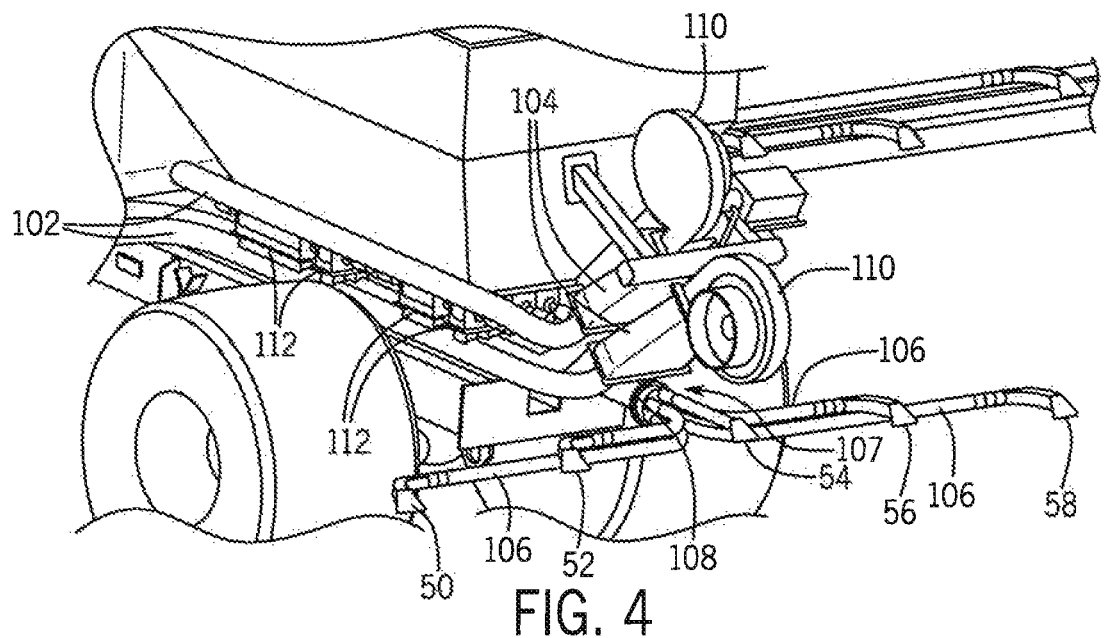
FIG. 4 is a rear isometric view of a conveying system on a fertilizer spreader according to another exemplary embodiment of the invention.
Figure 5:
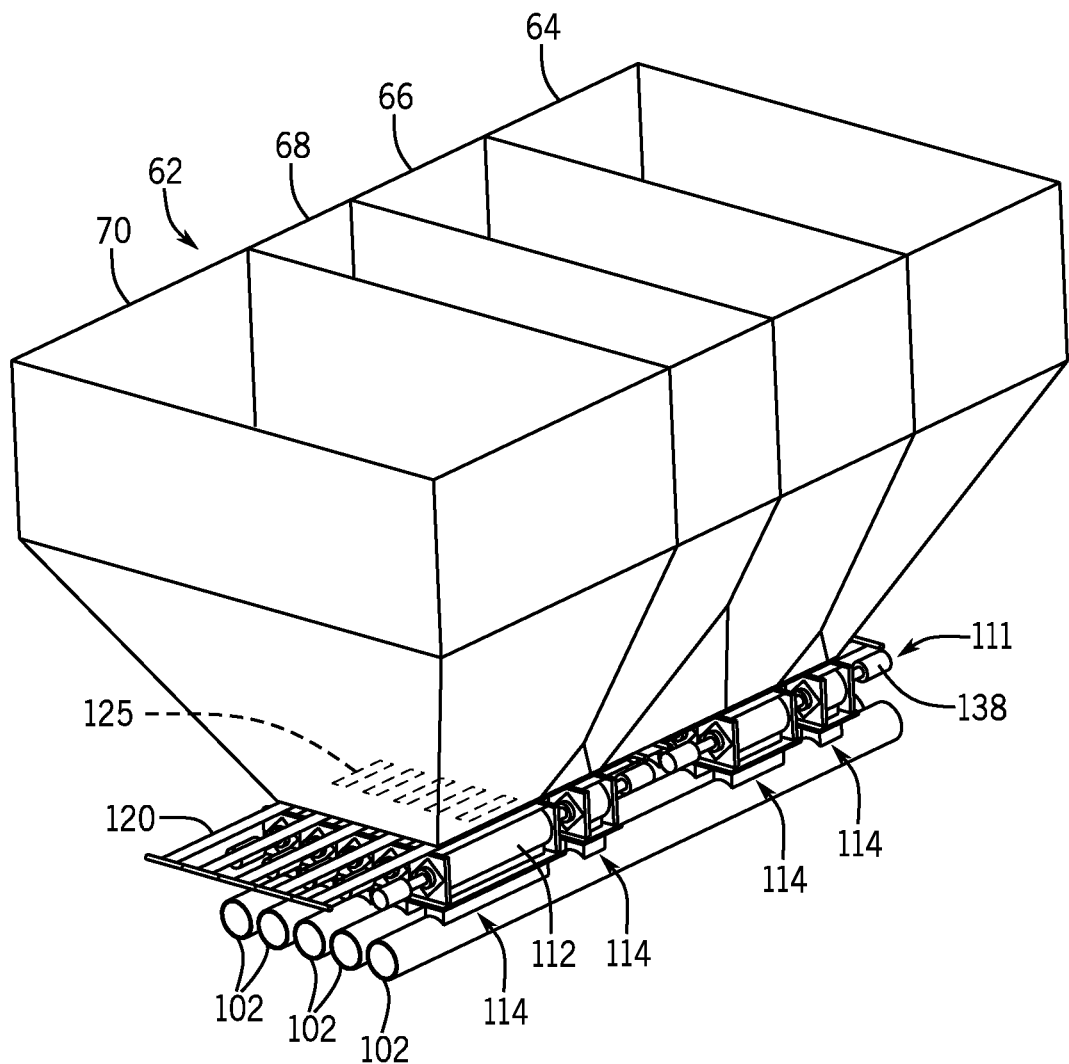
FIG. 5 is an isometric view of a tank and inline metering system according to another exemplary embodiment of the invention.

Referring now to the drawings, and more particularly to FIGS. 1-3, there is shown an agricultural application implement 10, on which a pneumatic conveying system 100 can be used. In the exemplary embodiment shown, application implement 10 is a granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for fertilizer applicator 10 are a spreading outlet or nozzle. In the exemplary embodiment shown, boom 14 includes ten nozzles 18, 19, 20, 22, 24, 26, 28, 29, 30 and 32; and boom 16 includes ten nozzles 34, 35, 36, 38, 40, 42, 44, 45, 46 and 48. Additionally, at the back of applicator 10 there are five rear nozzles 50, 52, 54, 56 and 58 to provide full and complete coverage across the width of implement 10, including the area between the inboard-most nozzles 32 and 34 of booms 14, 16. Implement transport unit 12 is self-propelled by an engine in an engine compartment 59 and includes an operator cab 60. In the exemplary embodiment shown, an uncovered tank 62 includes compartments 64 and 70 for carrying particulate material to be distributed to and disbursed by nozzles 18-58. Further smaller compartments 66 and 68 can be provided to supply micro-nutrients or other materials to nozzles 18-58. The supply of particulate in compartments 64, 66, 68, 70 is replenished periodically from a still larger volume supply vehicle (not shown).

Fertilizer applicator 10 is illustrative of the types of equipment for which the conveying system 100 can be used; however, it should be understood that the conveying system 100 may, of course, be employed in conjunction with other agricultural equipment such as tillage, seeding or planting devices, and is useful in distributing particulate material other than fertilizer.

Looking now at FIGS. 1-3, in the illustrated exemplary embodiment the compartments 64-70 of the tank 62 are each disposed directly above the conveying system or assembly 100, which is a pneumatic conveying system 100. The system 100 includes five large diameter supply lines 102 that extend from a plenum 104 at one end, under the compartments 64-70 and terminate at the booms 14, 16 or at the rear nozzles 50-58. At the booms 14, 16, the supply lines 102 and the particulate material or product transported therein can be split by a suitable distribution structure or mechanism 107, such as a horizontal rotary distributor(s) 108, among or into a number of secondary or smaller supply lines 106 that are connected to the nozzles 18-58.

To collect and drive the particulate material along the lines 102, in the illustrated embodiment one or more fans 110 are operably connected to the plenum 104 opposite the lines 102. The air flow from the fans 110 is directed from the fans 110 through the plenum 104 and into the respective lines 102 as a result of the structure of the plenum 104. After the air flow passes through the one or more plenums 104 connected to the one or more fans 110 and collects/entrains the particulate material from the compartments 64-70 in a manner to be described, the air flow continues to flow along each of four (4) of the large diameter lines 102 that make approximately a 90° turn to connect to the booms 14, 16.

Figure 13:
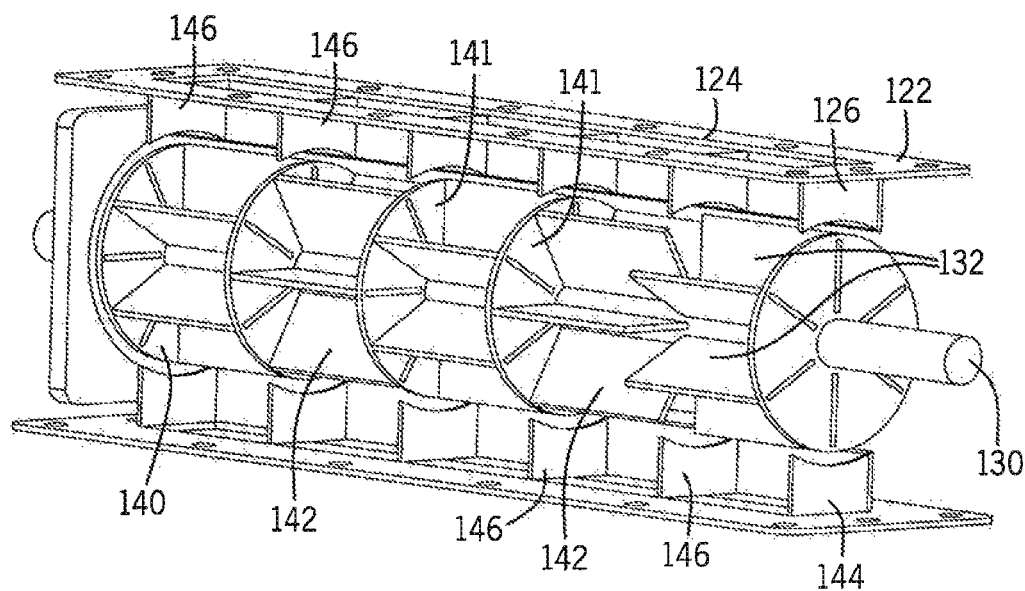
FIG. 13 is an isometric view of the rotary shaft of the inline metering system of FIG. 6

In order to spread the particulate material/product over/onto the center section over which the machine 10 passes, a large line 102 must move product to the rear nozzles 50-58 where there is no interference by the machine 10 on the spread pattern. To accomplish this a line 102 carrying only air is added on the side of the machine 10 and has a forward section 105 that extends from the plenum 104 to the front of the machine 10. At the front of the machine 10, the line 102 turns 180° and has a rearward section 109 that passes beneath the compartments 64-70 where the line 102 collects the particulate material/product and transports the product to the nozzles 50-58 at the rear of the machine 10.

In an alternative exemplary embodiment, it is contemplated that the conveying system 100 can be formed, in addition to or as a substitute for the pneumatic system 100, with the one or more mechanical conveyors (not shown) taking the form of one or more augers (not shown) that are disposed within the lines 102 and encircle the auger(s) along their length. The augers are each operably connected to a motor (not shown) that causes the augers to rotate within the respective lines 102, moving the particulate material in conjunction with the air flow through the lines 102. The operation of the motor can be controlled to control the speed of rotation of the augers, either collectively or independently from one another, such that the speed of the conveying system 100 can be varied as desired but not to meter the product(s).

Looking now at FIGS. 1, 2 and 4, in the illustrated exemplary embodiment the plenums 104 provide airflow from the fans 110 to all five lines 102 of the system 100, with one plenum 104 connected to the two (2) outside lines 102, with the other plenum 104 supplying the air flow to the center three (3) lines 102. The lines 102 are split in this fashion because of the higher pressure drop associated with the outermost lines 102 as a result of their length. With only the two higher pressure lines supplied by one plenum 104, it allows the fan 110 connected to the longer lines 102 to supply a higher pressure airflow through these lines 102 since less airflow is required for two lines 102 vs three lines 102. In the illustrated exemplary embodiment, the two fans 110 and associated plenums 104 are stacked vertically with respect to one another. However a different configuration can be utilized where the fans 110 and plenums 104 are arranged in the same horizontal plane in order to minimize the space requirements, with the plenums 104 also optionally being rotated 90° from the illustrated configuration.

Referring now to FIGS. 4-13, in the illustrated exemplary embodiment the particulate material/product contained within each of the compartments 64-70 of the tank 62 is introduced into the airflow in the various lines 102 via an airtight inline product metering system 111, that is formed of a number of metering devices 112 that function to meter the product flowing from the compartments 64-70 into each line 102.

In the exemplary embodiment of FIG. 5, the metering devices 112 forming the inline metering system 111 are disposed in sets 114 located directly beneath each compartment 64-70 of the tank 62, with each set 114 of metering devices 112 associated with one compartment 64-70 of the tank 62. The metering device 112 are connected in alignment with apertures 125 formed in the compartments 64-70 to enable particulate material to enter the metering devices 112 and with opening 118 in the lines 102 to enable the particulate material to be dispensed from the metering devices 112 into the lines 102. The number of metering devices 112 forming each set 114 corresponds to the number of lines 102 in the conveying system 100, such that the particulate material from each compartment can be dispensed into each line 102 utilizing the same set 114 of metering devices 112.

In addition, in the illustrated exemplary embodiment, while the width of the metering devices 112 in each set 114 is the same in order to correspond to the size of the lines 102, the length of the metering devices 112 in each set 114 is dependent of the size of the compartment 64-70 associated with the set 114, and/or tank and the type of particulate material held within that compartment 64-70. For example, the larger compartments 66, 70 of the tank 62 can contain urea that will be metered at a higher rate per acre, thus requiring longer metering devices 112 in the set 114 associated with the compartments 66, 70 to avoid excessive operational speeds for the metering devices 112. In contrast, smaller compartments 66, 68 are configured to retain micronutrients therein, such as zinc, for example, which are normally spread at a lower rate per acre, and thus have smaller metering devices 112 in the sets 114 associated with these compartments 64, 68. The positioning of compartments 64-70 of different sizes within the tank 62 is selected to avoid physical interference between the operating parts of the metering devices 112 and could be in any order, large or small compartments.

Looking now at FIGS. 6, 7 and 12, the metering system 111 includes a plurality of metering devices 112. Each metering device 112 is formed with a gate 120 that is slidably disposed within a guide 122 that is secured to the tank 62 below the compartments 64-70 associated with each metering device 112. The gate 120 selectively covers an inlet opening 124 defined within the guide 122 that is aligned with one discharge aperture 125 (as schematically illustrated in FIG. 5, particulate material supply compartment 70 is shown with a plurality of discharge apertures shown in dashed lines, only one aperture of the plurality of apertures (five (5) apertures) shown labeled with the numeral "125", it being understood that each of the remaining particulate material supply compartments 64-68 also include a plurality of discharge apertures as illustrated for compartment 70) in one of the adjacent compartments 64-70 and each discharge aperture 125 communicates, when the gate 120 is open (FIG. 9), with the inlet opening 124 and with an optionally flared or straight inlet channel 126 that extends downwardly from the guide 122. The inlet channel 126 is connected to and communicates with the interior of a housing 128 for a rotating shaft 130. The shaft 130 includes a number of radially extending paddles 132 thereon. The paddles 132 can be positioned on the shaft 130 in any suitable configuration, and in the illustrated exemplary embodiment are positioned equidistant from one another around the circumference of the shaft 130. The paddles 132 extend towards the housing 128 with a very small space 134 (FIG. 12) left between the outer edge 136 of the paddle 132 and the housing 128 in order to prevent particulate material from falling directly through the metering device 112 and prevent or limit the flow of pressurized air from the lines 102 upwardly through the metering device 112 and into the compartments 64-70 by forming a somewhat airtight seal between the paddles 132 and the housing 128. If paddles 132 are non-metallic, they can have an interference fit with housing 128 to make a better air seal.

With reference now to FIGS. 7, 8 and 13, in metering devices 112 for different sets 114, the length of the device 112 can vary the number and positioning of the paddles 132 present on the shaft 130. For example, while the metering device 112 associated with the largest compartment 70 has equal sized paddles 132 disposed across the shaft 130, the devices 112 associated with the compartment 64-68 have paddles 132 of different sizes disposed on the shaft 130 to accommodate for the length of the shaft 130. Further, as best shown in FIG. 13, the metering device 112 can be formed with multiple segments 140, each segment 140 separated by a circular separator plate 141, that is formed with a close tolerance to the housing 128 similar to paddles 132, and including paddles 132 that are offset by thirty (30) degrees to create pockets 142 between the paddles 132 of sixty (60) degrees. The pockets 142 can be offset to lower the torque variation during operation of the shaft 130 as well as reducing the product pulsing effect at lower rotational speeds. Other angles and/or number of paddles 132 may be used. Other spacings, and/or variable spacings of separator plate/divider 141 may also be used.

The shaft 130 is operably connected to a motor 138, such as an electric or hydraulic motor, that operates to rotate the shaft 130 and the paddles 132 within the housing 128 at the desired speed to meter the flow of the particulate material through the metering device 112 into the line 102. In an alternative embodiment, the motor 138, or a separate motor/actuator (not shown), is additionally operably connected to the gate 120 in order to selectively open or close the gate 120 relative to the guide 122, thus controlling the flow of particulate material into the metering device 112 from the compartment 64-70.

Figure 6:
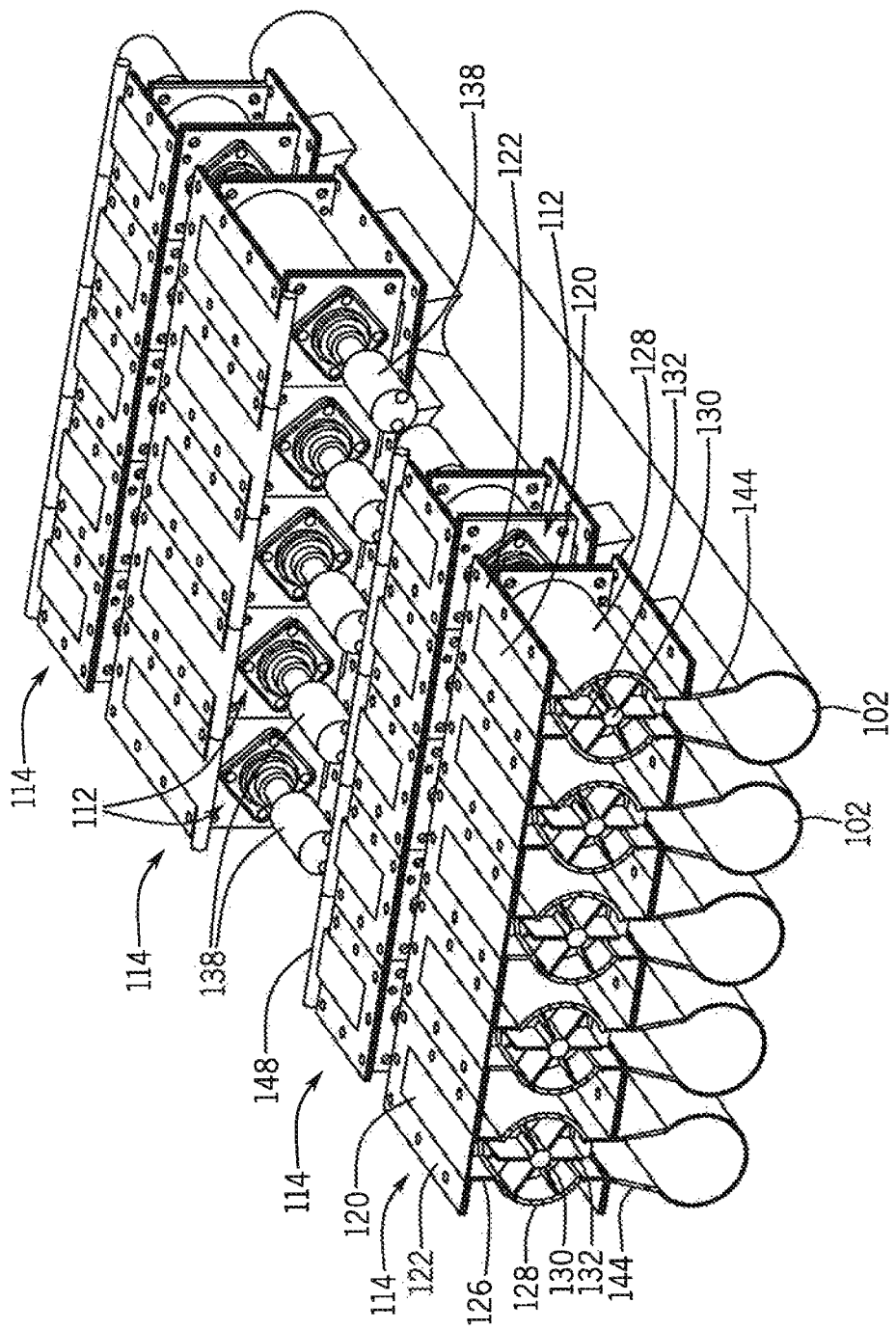
FIG. 6 is a partially broken away, isometric view of the inline metering system of FIG. 5.
Figure 12:
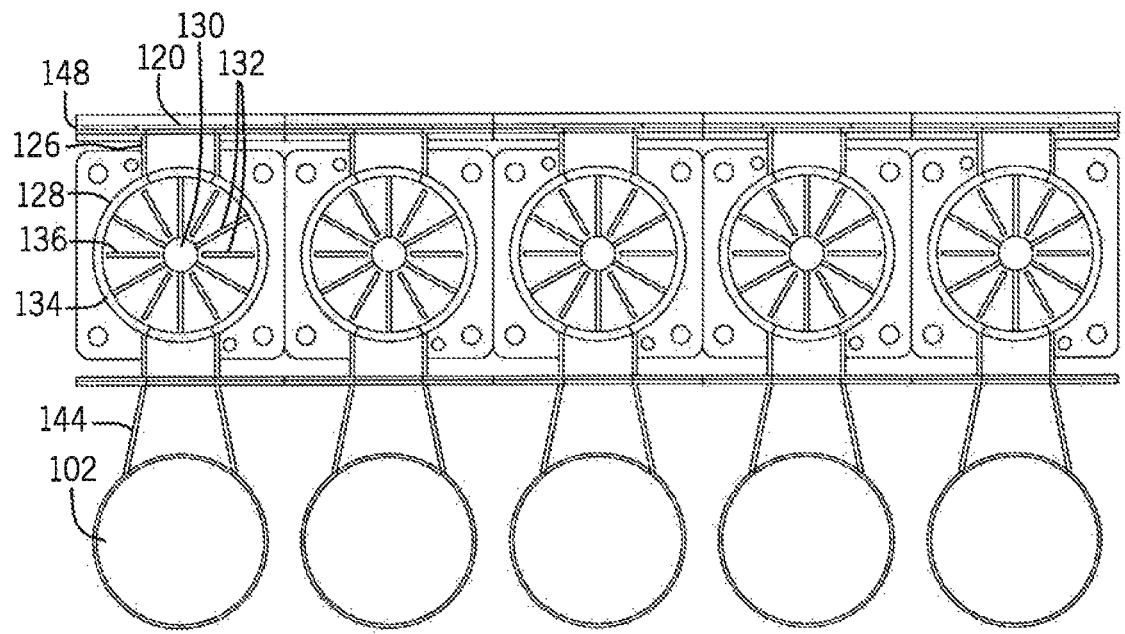
FIG. 12 is a cross-sectional view of the inline metering system of FIG. 6.

Below the shaft 130, the housing 128 is connected to a discharge channel 144 that extends between the housing 128 and the line 102. In the illustrated exemplary embodiments of FIGS. 6, 12 and 13, the discharge channel 144 can be formed to be straight or to optionally flare outwardly as it extends away from the housing 128 in order to enable the particulate material discharged through the channel 144 to be move evenly distributed into the line 102. Further, as best shown in the exemplary embodiment of FIG. 13, the channel 144 can contain baffles 146 therein that extend across the discharge channel 144 and are disposed any angle from ninety (90) degrees to forty-five (45) degrees to deflect the flow of particulate material and mix it more smoothly with the air flow in the line 102 as well as with other particulate materials metered from an upstream compartment 64-70. The baffles 146 can also be present in the inlet channels 126, as shown in the exemplary illustrated embodiment of FIG. 13. Other devices can be placed in discharge channel 144 that may aid in material dispersion as it flow into line 102.

Figure 7:
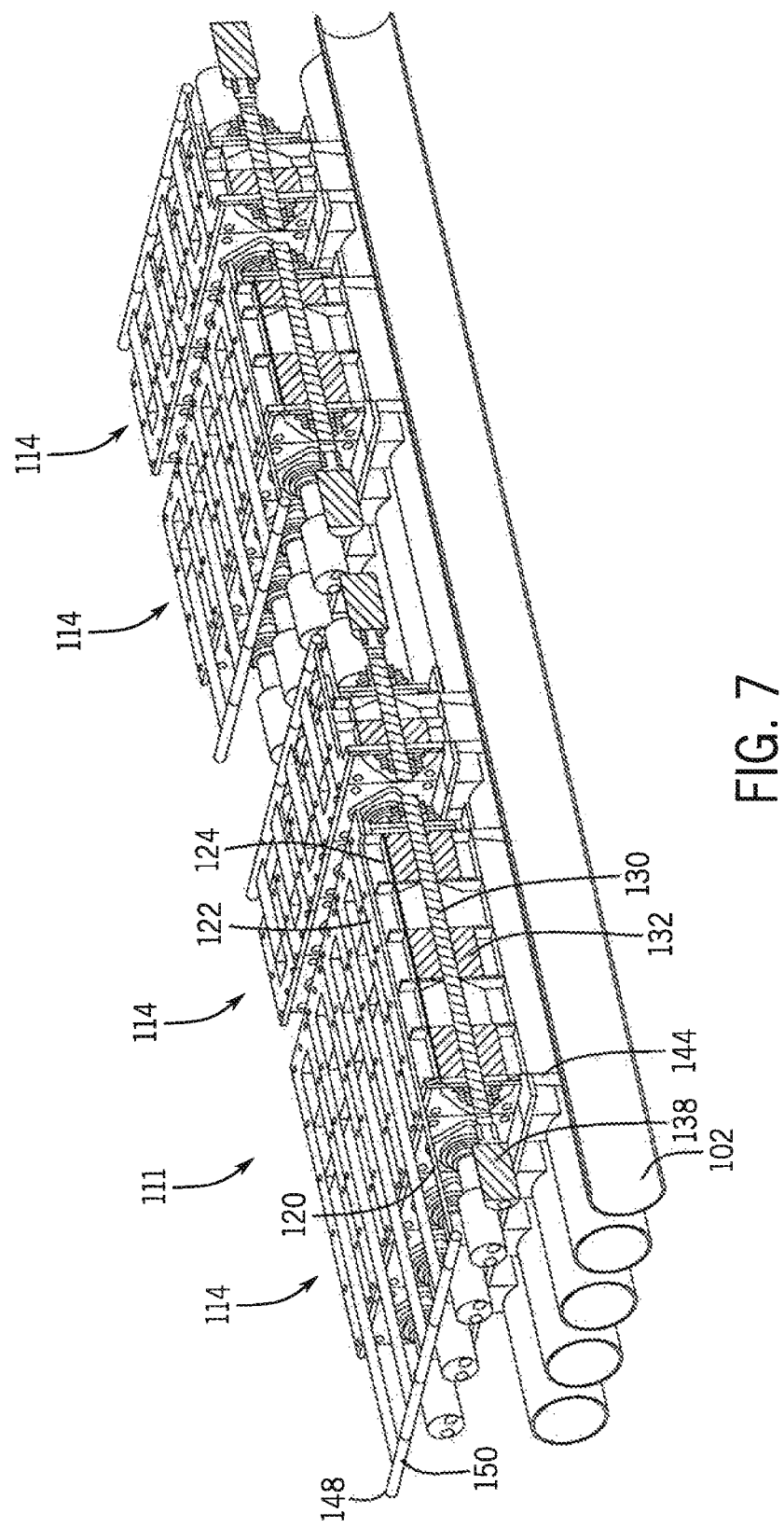
FIG. 7 is a partially broken away, isometric view of the inline metering system of FIG. 6.
Figure 8:
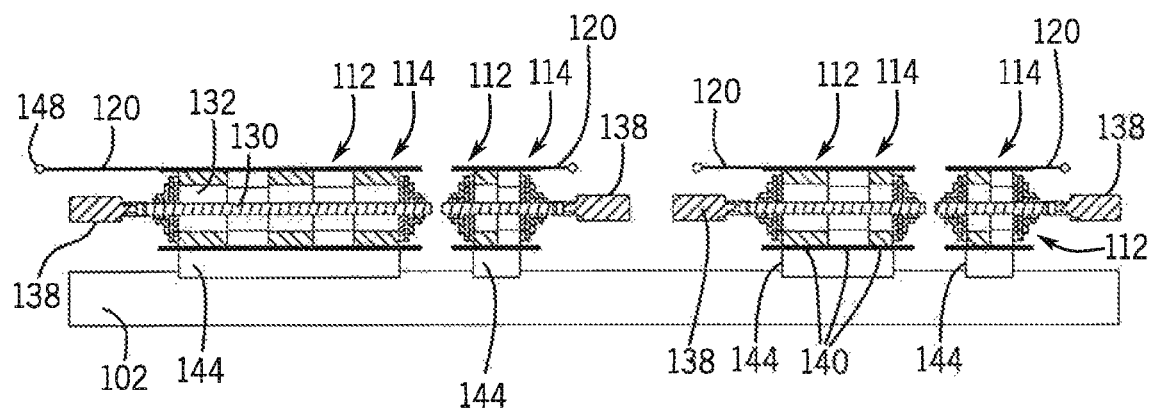
FIG. 8 is a side elevational view of the inline metering system of FIG. 6 is a first configuration.
Figure 9:
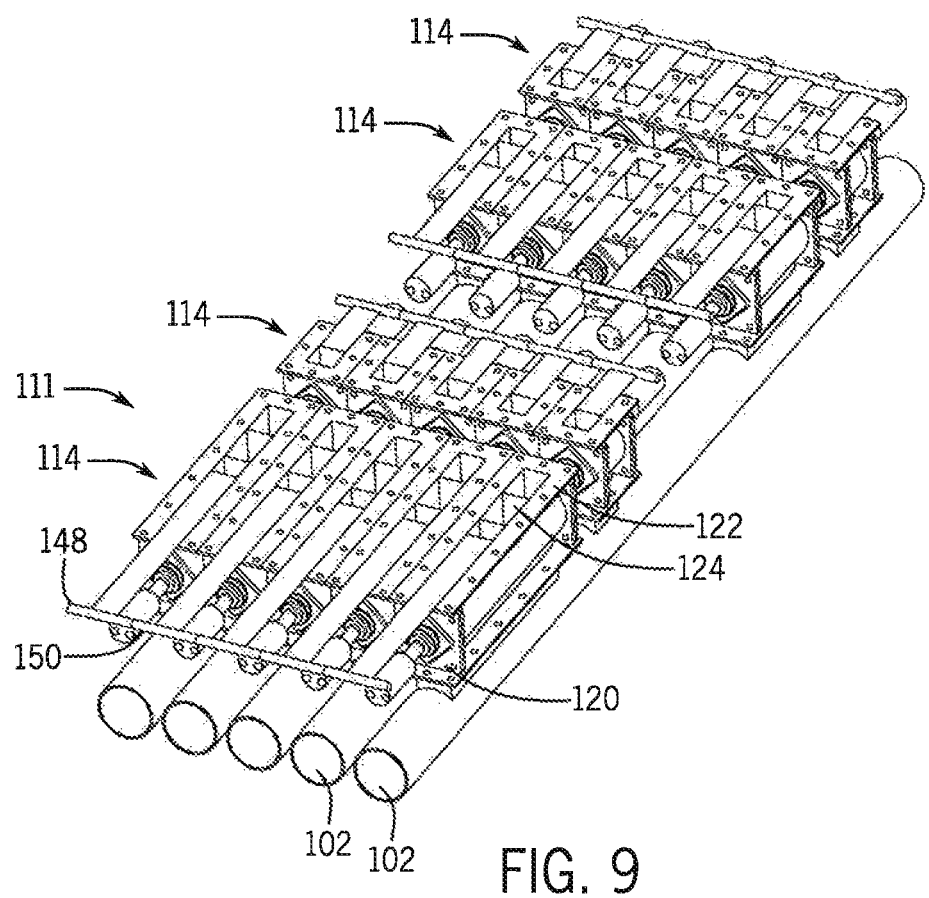
FIG. 9 is an isometric view of the inline metering system of FIG. 8 in a first configuration.
Figure 10:
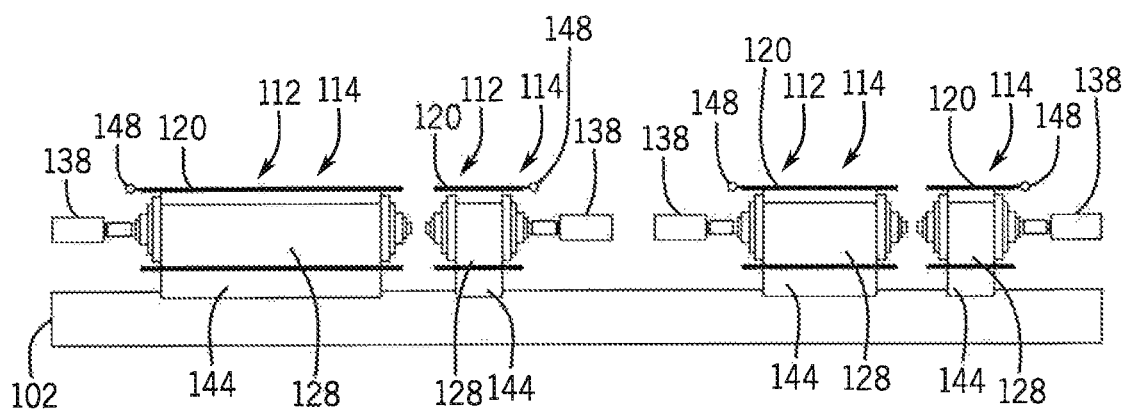
FIG. 10 is a side elevational view of the inline metering system of FIG. 6 is a second configuration.
Figure 11:
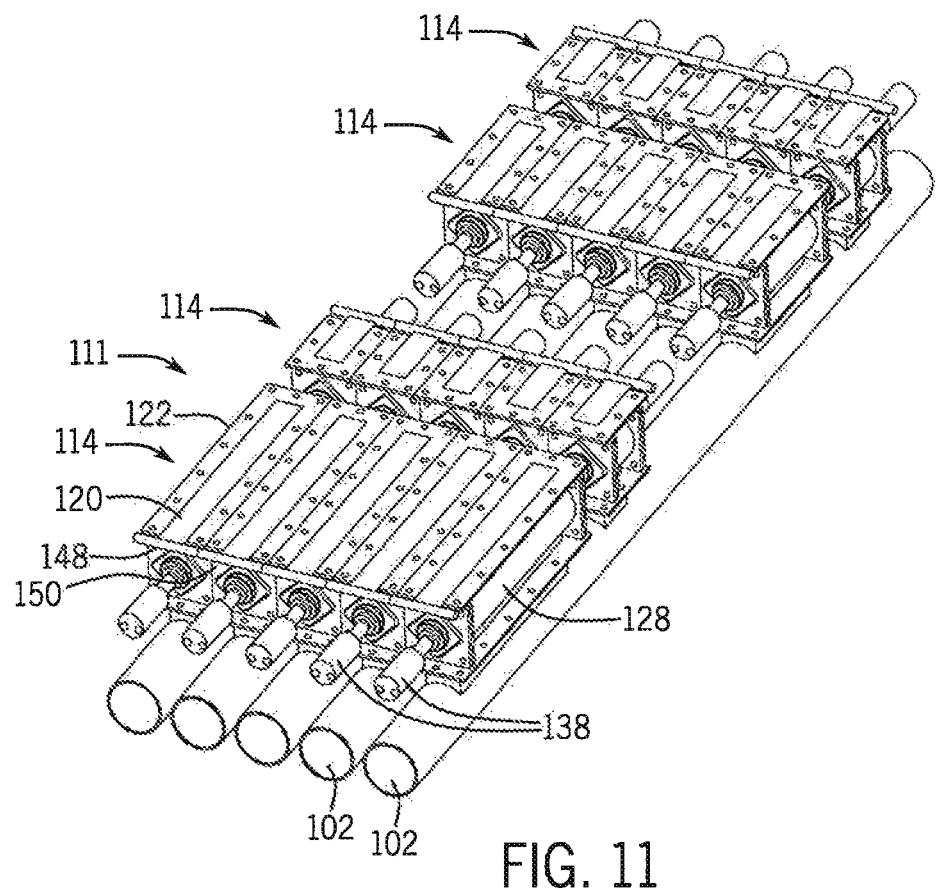
FIG. 11 is an isometric view of the inline metering system of FIG. 10 in a second configuration.

With reference now to FIGS. 8-11, in operation initially the metering system 111 is in the configuration of FIGS. 10 and 11, where the gates 120 are all in the fully closed position to completely cover the openings 124 in the guides 122. To begin to dispense the particulate into the metering system 111, the gates 120 for each set 114 of metering devices 112 are moved outwardly from the closed position, as shown in FIGS. 8 and 9. In the illustrated exemplary embodiments, the gates 120 all include a handle 148 opposite the guide 122 that can be grasped to manually slide the gate 120 relative to the guide 122. Further, the handles 148 for the gates 120 in each set 114 can be interconnected via a linkage 150, such that the gates 120 in each set 114 can be moved in unison to provide identical dispensing of the particulate material through the metering devices 112 within the set 114 into the lines 102 connected with each device 112. Depending upon the desired application rate for the material to be dispensed from each compartment 64-70, the gates 120 for the metering devices 112 in the associated set 114 can be adjusted to provide the desired flow of particulate material from the individual compartments 64-70 into the metering devices 112 to provide the desired flow rate into the lines 102. For example, as illustrated in the exemplary embodiment of FIG. 7, the gates 120 are partially opened to enable the operator to run the system 111 with the metering devices 112 at higher rotational speeds and using only a few sections, instead of operating with all gates opened for a given series of five sets 114 on the same tank 62 that would run at slower speed in order to eliminate possible material pulsing in the airstream. In addition, each metering device 112 in each set 114 can run independently at various speeds to allow sectional control, and the gates 120 for each set 114 can be disposed at or between the fully opened (FIG. 8) or fully closed (FIG. 10) positions independently of any other gates 120 for the sets 114 associated with other compartments 64-70. For example, in Table I below, certain exemplary configurations for the gates 120 of the individual sets 114 associated with the compartments 64-70 in the tank 62 are shown when the inline metering system 111 is utilized to supply the conveying system 100 with the various types of fertilizers (urea, potash, . . . etc) seeds (canola, wheat, . . . etc.) and micro-nutrients (zinc, manganese, potassium, sulfur, . . . etc) for different utilizations of the applicator 10.

TABLE 1

Exemplary Metering System Configurations

| Products | Examples | Compartment 64 (small-4") | Compartment 66 (medium - 10") | Compartment 68 (small-4") | Compartment 70 (large-20") |
|---|---|---|---|---|---|
| Single Product | Urea | Gates Closed | Gates Closed | Gates Closed | X |
| Dual Products | Urea + Potash | X | X | X | X |
| Dual Products + Micro-Nutrients | Urea + Potash + 2 Micro-Nutrients | X | X | X | X |
| Canola | Canola | Gates Closed | Gates Closed | X | Gates Closed |
| Wheat | Wheat | Gates Closed | X | Gates Closed | X |
| Rice | Rice | Gates Closed | X | Gates Closed | X |
| Soybean | Soybean | Gates Closed | X | Gates Closed | X |

In addition to the use of the gates 120 to control the flow of particulate materials into the metering devices 112, other purposes or uses of the gates 120 include:

1. Closing the gates 120 to perform maintenance on the metering device 112 where the gates 120 prevent particle dripping;
2. Closing the gates 120 to close the bottom of any compartment 64-70 when not needed or in use to avoid air flow leakage from the metering device 112 into the compartments 64-70;
3. Adjusting the position of the gates 120 within the guides 112 to control the size of the longitudinal opening 124 to synchronize the rotational speed of the metering devices 112 to obtain the proper rate; and
4. Closing the gates 120 to keep the bottom of the compartments 64-70 clean because the gates 120 move over the top of the metering devices 112 and can push any extra particulate material of the compartment and into the metering device 112.

While the conveying system 100 including the inline metering system 111 disclosed so far herein have been primarily with respect to pneumatic and/or mechanical fertilizer application equipment or applicator commonly referred to as a "floater", it should be understood that the advantages from the conveying system 100 including the inline metering system 111 disclosed herein can be obtained on other types of equipment for applying particulate materials in a field. Planters of various types are known to include an applicator unit, such as a drill or seeder, and may include an air cart having one or more bulk tanks carrying fertilizer and/or seeds to be planted. The conveying system 100 including the inline metering system 111 disclosed herein can be provided on the planter, and one or more air/seed inductors on the air cart. If the air cart is then used with a planter of a different type, or with another type of particle application equipment, adjustments to the conveying system 100 including the inline metering system 111 can be made without the need to adjust the air/seed inductor assembly on the air cart. Accordingly, switching from one crop to another crop or from one planter to another planter does not require major adjustment of the air/seed inductor assembly on the air cart.

In using a conveying system 100 as disclosed herein, a variety of materials can be applied by a variety of different implements. The particulate material to be applied is contained in one or more compartments. The particulate material or materials are supplied from the tanks to the conveying system 100 wherein the material or materials are conveyed to one or more particle injectors while being intermixed with one another. At the particle injector the conveyed product or products are provided in a metered flow and transferred to one or more particle delivery unit, which can be a broadcast spreader, seeder for depositing seeds or other materials across the surface of soil, a row opener unit for depositing seeds or other material in rows, or the like.

Various other alternatives are contemplated is being within the scope of the following claims particularly pointing out and distinctly claiming the subject matter regarded as the invention.

We claim:

1. A method of delivering a plurality of agricultural products from a plurality of compartments containing the plurality of products to a delivering unit to apply the products in a field, the method comprising the steps of:

supplying the plurality of agricultural products from the plurality of particulate material supply compartments to a supply line of a conveying system each compartment of the particulate material supply compartments including a plurality of discharge apertures;

metering the products from the plurality of particulate material supply compartments into the supply line of the conveying system through a metering system including a plurality of metering devices, each metering device including a housing connected to at least one of the compartments and positioned between the at least one compartment and the conveying system, a guide disposed on one end of the housing and defining an inlet opening disposed in alignment with at least one discharge aperture of the plurality of discharge apertures in the compartment, a gate slidably engaged with the guide to selectively open and close the inlet opening, a shaft disposed within the housing, the shaft including a plurality of paddles thereon, wherein the clearance between the paddles and the housing limits air flow through each metering device between the supply line and the adjacent particulate material supply compartment and a motor operably connected to the shaft to rotate the shaft within the housing;

mixing the agricultural products together in the conveying system to form a mixed product;

conveying the mixed product to the delivering unit; and applying the mixed product from the delivering unit onto an agricultural field.

2. The method of claim 1, wherein the step of metering the mixed product comprises altering the speed of rotation of the shaft within the housing.

3. The method of claim 1, wherein the step of metering the mixed product comprises altering the position of the gate relative to the guide to selectively expose the inlet opening.

4. The method of claim 1, wherein the plurality of metering devices further comprises a plurality of sets of metering devices operably connected between each of the particulate material supply compartments and a plurality of supply lines of the conveying system, and wherein the step of metering the mixed product comprises simultaneously altering the position of the gates of each of the plurality of metering devices in a set relative to the guide to selectively expose the inlet openings.

* * * * *